(No Model.) 2 Sheets—Sheet 1.

C. P. HIGGINS.
MACHINE FOR WELDING PIPE.

No. 356,468. Patented Jan. 25, 1887.

WITNESSES:
Aug Crowley
W. W. Weston

INVENTOR
Campbell P. Higgins
BY
Chas W. Forbes
ATTORNEY

N. PETERS, Photo-Lithographer, Washington, D. C.

(No Model.)   2 Sheets—Sheet 2.
C. P. HIGGINS.
MACHINE FOR WELDING PIPE.
No. 356,468.   Patented Jan. 25, 1887.
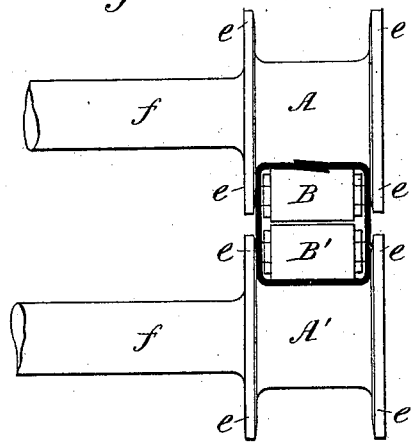
Fig: 5.
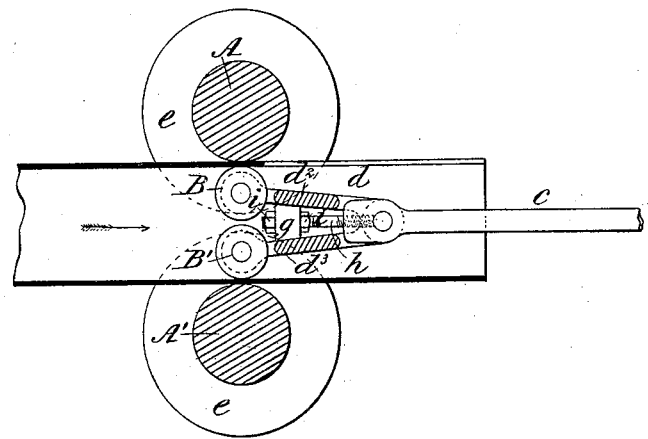
Fig: 6.
WITNESSES:   INVENTOR

UNITED STATES PATENT OFFICE.

CAMPBELL P. HIGGINS, OF PHILADELPHIA, PENNSYLVANIA.

MACHINE FOR WELDING PIPE.

SPECIFICATION forming part of Letters Patent No. 356,468, dated January 25, 1887.

Application filed June 18, 1886. Serial No. 205,527. (No model.)

*To all whom it may concern:*

Be it known that I, CAMPBELL P. HIGGINS, a citizen of the United States, residing at Philadelphia, Pennsylvania, have invented a new and useful Improvement in Machines for Welding Tubes, of which the following is a specification, reference being had to the accompanying drawings, in which—

Figure 1:
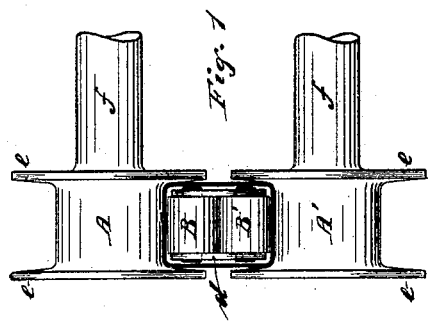
Figure 3:
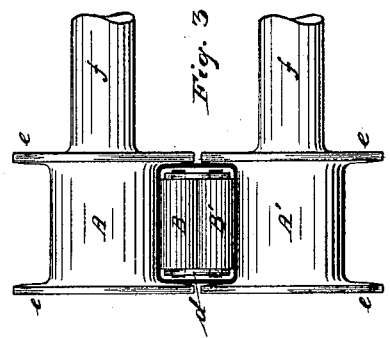
Figure 2:
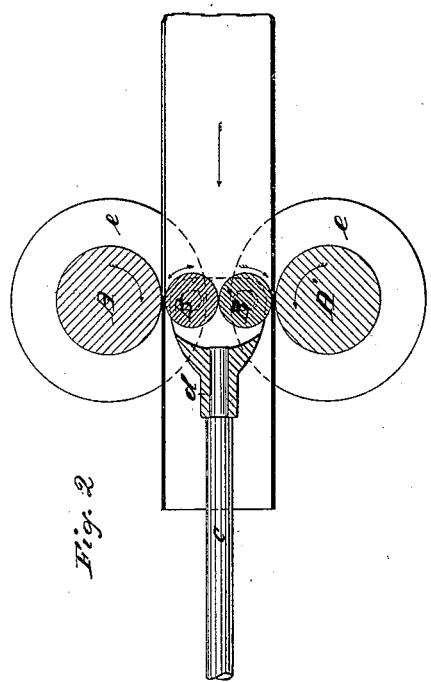
Figure 4:
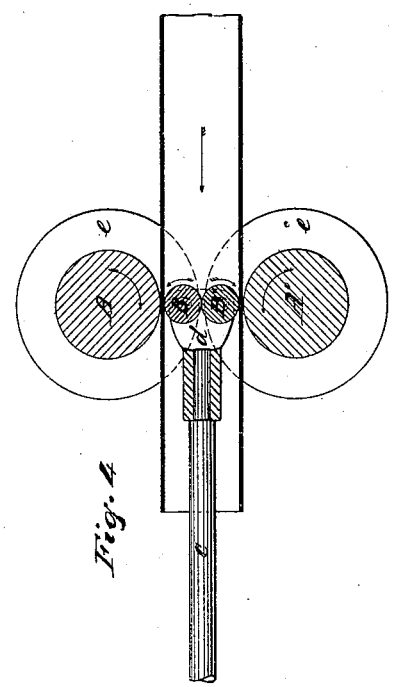

Figure 1 is an elevation; Fig. 2, a vertical central section of Fig. 1; Fig. 3, an elevation of a separate similar machine; Fig. 4, a vertical central section of Fig. 3; Fig. 5, an elevation of a similar machine, showing a modification of certain parts; Fig. 6, a vertical central section of Fig. 5.

Similar letters of reference indicate corresponding parts throughout.

This invention is designed for the purpose of completing the formation of square or rectangular tubing by welding the overlapping beveled edges of the same and uniformly straightening the sides thereof; and in order that others may understand and use the same, I will proceed to describe its construction, explain its operation, and subsequently point out in the appended claims its novel characteristics.

Referring to the drawings, the pair of rolls A A', having deep flanges e, are suitably connected with motive power which causes them to revolve toward one another at an equal speed. Their shafts f are mounted in suitable bearings, which firmly maintain a fixed distance between centers, such distance being determined by a dimension between the body of the rolls equal to the exterior size of the tubing to be passed.

Between the rolls A A', and in the same plane with the axes thereof, are supported a small pair of rolls, B B', the combined diameters of which exactly equal the interior size of the tubing, leaving a clearance between the interior and exterior rolls such as will submit the sides of said tubing to a certain degree of compression and insure thorough welding of the overlapping edges and straightening of the opposite sides thereof.

The rolls B B', Figs. 1 to 4, inclusive, are supported in position by means of the frame $d$ and rod $c$, the latter extending a distance sufficient to allow the passage of the tube and secured to a suitable support at its end. The rollers B B' are hung with free bearings in the frame $d$, which allow their compression to be received by their adjacent faces.

The flanges of the exterior roll A' serve to support the exterior of the pipe, but are not indispensable, whereas the flanges of the exterior roll A are essential to sustain the sides of the pipe near the weld and prevent the overlapping metal from spreading.

Figs. 5 and 6 illustrate a modification of the supporting-frame $d$ for the rolls B B', in which said frame is composed of two parts or jointed levers, $d^2$ $d^3$, having between their inner converging faces a wedge-shaped block, $g$. The block $g$ may be set toward the fulcrum of the levers $d^2$ $d^3$ by means of the bolt $h$ and adjusting-nuts $i$, for the purpose of spreading the rolls B B' apart, regulating their distance between centers to accommodate the different thicknesses of iron in various tubes.

In operation this invention is designed to weld and complete the formation of square or rectangular tubes from plates which have been subjected to a prior operation, preferably by a machine of a character which I have described for the purpose in a separate application filed simultaneously herewith. The rectangular tube is first introduced between the rolls, Figs. 1 and 2, through which the welding-pass is made, moving as indicated by arrows, the two remaining sides thereof of said tube being compressed by a subsequent pass between the rolls shown in Figs. 3 and 4. In the case of a square tube, (shown in Fig. 5,) obviously but one set of rolls is required for both passes.

In the system under consideration the friction or resistance due to drawing the pipe between a set of exterior rolls and over a set of interior rolls is materially less than drawing the same over a solid interior mandrel, as is the common practice. The metal of the pipe through its entire cross-section is made to flow endwise to some extent, the thickness of the finished pipe being somewhat less than the original thickness of the plate from which the pipe was formed.

My improvement reduces the resistance to a minimum, in which it is required merely to overcome the rolling friction from the surface of the pipe internally and externally, together with the compression of the pipe between the exterior and interior roll at the bend at which the weld takes place.

Having thus fully described my invention, what I claim, and desire to secure by Letters Patent, is—

1. In a machine for welding rectangular pipe, the combination of a pair of external flanged rolls embracing and supporting the exterior surfaces of the pipe to be welded with a mandrel having its acting surfaces composed of a pair of cylindrical rolls having their axes located in a common plane with and parallel to the axes of the exterior rolls.

2. In a machine for welding rectangular pipe, the combination of a pair of external flanged rolls embracing and supporting the exterior surfaces of the pipe to be welded with a mandrel having its acting surfaces composed of a pair of cylindrical rolls bearing upon each other throughout their entire length, and having their axes located in a common plane with and parallel to the axes of the exterior rolls.

3. In a machine for welding rectangular pipe, the combination of a pair of external flanged rolls embracing and supporting the exterior surfaces of the pipe to be welded with a mandrel having its acting surfaces composed of a pair of cylindrical rolls, and mechanism, substantially such as described, for adjusting said rolls toward and from each other, and having their axes located in a common plane with and parallel to the axes of the exterior rolls.

CAMPBELL P. HIGGINS.

Witnesses:
CHAS. W. FORBES,
W. H. HANNA.